United States Patent [19]

Sato

[11] Patent Number: 4,820,242
[45] Date of Patent: Apr. 11, 1989

[54] CONTINUOUSLY VARIABLE TRANSMISSION

[75] Inventor: Keiji Sato, Mitaka, Japan

[73] Assignee: Fuji Jukogyo Kabushiki Kaisha, Tokyo, Japan

[21] Appl. No.: 18,507

[22] Filed: Feb. 25, 1987

[30] Foreign Application Priority Data

Oct. 22, 1986 [JP] Japan .................................. 61-251232

[51] Int. Cl.$^4$ ............................................ F16H 11/06
[52] U.S. Cl. ........................................ 474/8; 474/11; 474/17
[58] Field of Search .......................... 474/8, 18, 28–30, 474/201, 242, 69, 70, 11, 12, 17; 74/865–869

[56] References Cited

U.S. PATENT DOCUMENTS

| | | | |
|---|---|---|---|
| 4,475,416 | 10/1984 | Underwood | 474/18 X |
| 4,596,536 | 6/1986 | Okawa et al. | 474/8 |
| 4,673,379 | 6/1987 | Ohzono et al. | 474/28 |

*Primary Examiner*—Thuy M. Bui
*Attorney, Agent, or Firm*—Martin A. Farber

[57] ABSTRACT

A continuously variable transmission has a drive pulley having a movable disc, a driven pulley having a movable disc, and a belt engaged with both pulleys. The amount of offset between a center line of the drive pulley and a center line of driven pulley is set so that the offset between center lines of both the pulleys at a pulley ratio for providing a maximum belt speed becomes zero.

7 Claims, 5 Drawing Sheets

CONTINUOUSLY VARIABLE TRANSMISSION

BACKGROUND OF THE INVENTION

The present invention relates to continuously variable belt-drive transmission for a motor vehicle.

A known continuously variable belt-drive transmission disclosed in U.S. Pat. No. 4,369,675 comprises an endless belt running over a drive pulley and a driven pulley. Each pulley comprises a movable conical disc which is axially moved by a fluid-operated servo device so as to vary the running diameter of the belt on the pulleys in dependency on driving conditions.

FIG. 3 shows the conventional continuously variable belt-driven transmission for a motor vehicle.

The belt-drive transmission has a main shaft 4 and an output shaft 9 provided in parallel with the main shaft 4. A drive pulley 1 and a driven pulley 6 are mounted on shafts 4 and 9 respectively. A fixed conical disc 2 of the drive pulley 1 is integral with main shaft 4 and an axially movable conical disc 3 is axially slidably mounted on the main shaft 4. The movable conical disc 3 also slides in a cylinder 16 formed on the main shaft 4 to provide a servo device. A conical face 2a of the fixed conical disc 2 confronts a conical face 3a of the movable conical disc 3 thereby forming a groove 5 therebetween.

A fixed conical disc 7 of the driven pulley 6 is formed on the output shaft 9 opposite a movable conical disc 8. The movable conical disc 8 is slidably engaged in a cylinder 17 on the output shaft 9 to form a servo device. Conical faces 7a and 8a of the respective discs 7 and 8 form a groove 10. A belt 11 engages the drive pulley 1 and the driven pulley 6.

The belt 11 comprises a plurality of metal elements 12 adjacently arranged in the longitudinal direction of the belt and each having a pillar portion 14 at the center and horizontal slits at both sides thereof, and a seamless laminated endless metal carrier 13 inserted in the slits.

Each element 12 has a dimple 12a on its one side and a cavity 12b on the other side. The dimple 12a of one element 2 engages with the cavity 12b of the adjacent element and all elements are arranged side by side. The belt is thus assembled.

When the movable conical discs 3 and 8 are axially moved along the shafts 4 and 9 for changing the transmission ratio, the center lines of the grooves 5 and 10 move relative each other. Such a misalignment (hereinafter, called offset) causes the edge of carrier 13 of the belt 11 to rub against the pillar portions 14 of the elements 12 or the conical faces 2a, 3a and 7a, 8a of the pulleys. Additionally, running of the belt 11 becomes unstable when the entering pulleys. As a result, the belt easily wears out and the conical surfaces become rough.

Referring to FIGS. 7 and 8, the length L of the belt is $$L = (\pi + 2\phi)R_P + 2D\cos\phi + (\pi - 2\phi)R_S \quad (1)$$

where $R_P$ and $R_S$ are the radii of the drive and driven pulleys respectively.

If the pulley ratio is 1, namely $R_P = R_S = R$, the above equation (1) can be written as $$L = 2D + 2R\pi \quad (2)$$

From FIG. 7, $$R_P = R_S + D\sin\phi \quad (3)$$

When equations (2), (3) are substituted for Eq. (1), $$2R_P = D\sin\phi - 2R = \frac{2D}{\pi}(1 - \cos\phi - \phi\sin\phi) \quad (4)$$

On the other hand, supposing the offset is zero when the pulley ratio is 1 ($R_p = R_S = R$), the offset $\Delta X$ can be represened as (FIG. 8)

$$\Delta X = X_P - X_S = \{(R_P - R) - (R - R_S)\}\tan\beta = \quad (5)$$

$$(2R_P = D\sin\phi - 2R)\tan\beta$$

By eq. (4) $\Delta X = \frac{2D}{\pi}(1 - \cos\phi - \phi\sin\phi)\beta \quad (6)$ The amount of the offset $\Delta X$ between the center lines of the pulleys 1 and 6 can be calculated from the following formula.

$$\Delta X = 2D/\pi\{(1 - \cos\phi - \phi\sin\phi)\}\tan\beta \quad (7)$$

where D is a distance between the centers of the drive and driven pulleys, $\phi$ is an angle between the linear portion of the belt and the line connecting the centers of the pulleys and $\beta$ is the angle of inclination of the conical face.

When D=140 mm, $\beta=11°$ and R=49.2 mm, in which R is the effective radii of the drive pulley 1 and driven pulley 6 when the pulley ratio i is 1, and assuming that the pulley ratio i varies in the range between 2.504 and 0.498, the amount of offset $\Delta X$ varies in the range between 0 and 0.734 mm. In a conventional design, the initial set value of the pulley arrangement should employ the medium of the range 0.734 mm of the offset amount. Both pulleys are disposed so that the amount of the offset varies between ±0.367 in the entire pulley ratio range (2.504–0.498), as shown in FIG. 4.

Therefore, the above mentioned formula (7) is rewritten as follows:

$$\Delta X = 2D/\pi(1 - \cos\phi - \phi\sin\phi)\tan\beta - 0.367 \quad (8)$$

Experiments concerning sensitivity of the belt in relation to the offset at each pulley ratio have shown that when the offset $\Delta X$ exceeds a permissible value, $\Delta X_p$, the belt is distorted and the running thereof becomes unstable. This occurs because when the belt makes a curve along the circumference of a pulley, the elements tend to rotate about the dimples or about the pillar portions. Ranges of permissible offset values $\Delta X_p$ for typical pulley ratios are shown by arrows in FIG. 5 wherein the vertical line and the horizontal line indicate the permissible offset amount $\Delta X_P$ and pulley ratio i, respectively. As can be seen from the graph of FIG. 5, the range of the permissible offset value $\Delta X_p$ is the narrowest when the running belt is at the maximum speed, namely the pulley ratio is at a lower value, which is hereafter called pulley ratio Top through the specification. FIG. 6 can be obtained from FIGS. 4 and 5, showing the relationship between the variation of the offset and the permissible offset value.

In these figures, Low of the pulley ratio corresponds 2.504, Med 1.0, Top 0.7, OD (Over Drive) 0.498, respectively.

It is apparent from FIG. 6 that the offset $\Delta X$ at the pulley ratio Top exceeds the range of the permissible value $\Delta X_p$. Accordingly, at the pulley ratio Top, that is when the running speed of the belt is at maximum (Vmax), the elements of the belt become unstable, greatly affecting the durability of the belt. U.S. Pat. No. 4,596,536 discloses a method for resolving the above described problems.

SUMMARY OF THE INVENTION

The object of the present invention is to provide a continuously variable belt-drive transmission for a motor vehicle in which the amount of the offset at a lower pulley ratio is set at a small value whereby durability of the belt is improved.

According to the present invention there is provided a continuously variable transmission for transmitting power of an internal combustion engine, including a drive pulley having an axially movable disc, a driven pulley having an axially movable disc, a belt engaged with both pulleys, wherein the amount of offset between a center line of the drive pulley and a center line of the driven pulley is set so that the offset between the center lines of both the grooves of the pulleys at a pulley ratio for providing a maximum belt speed may become zero.

The other objects and features of this invention will become understood from the following description with reference to the accompanying drawings.

DETAILED DESCRIPTION OF THE PREFERRED EMBODIMENT

Figure 1:
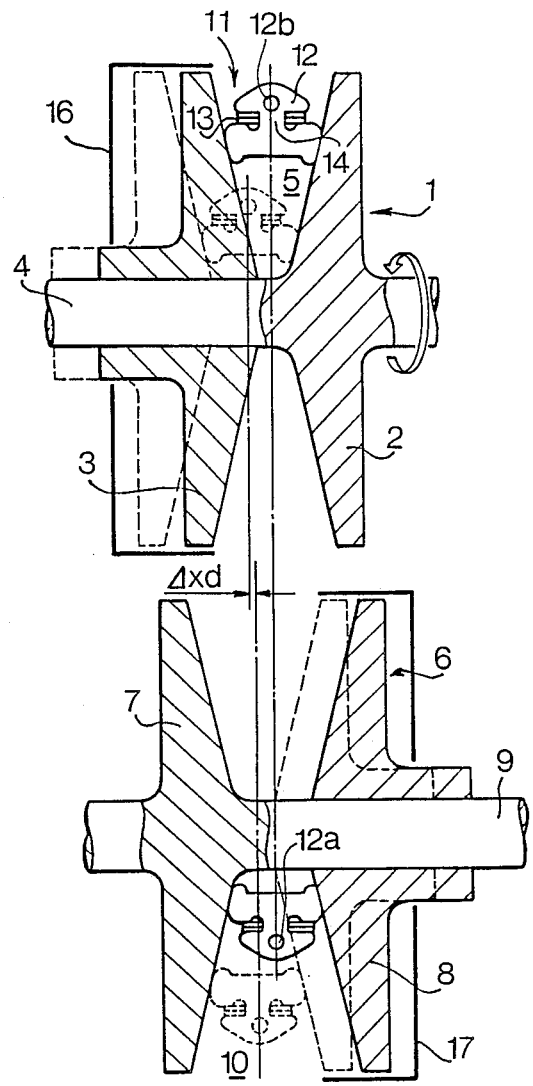
FIG. 1 is a schematic cross section of a continuously variable belt-drive transmission of the present invention.
Figure 3:
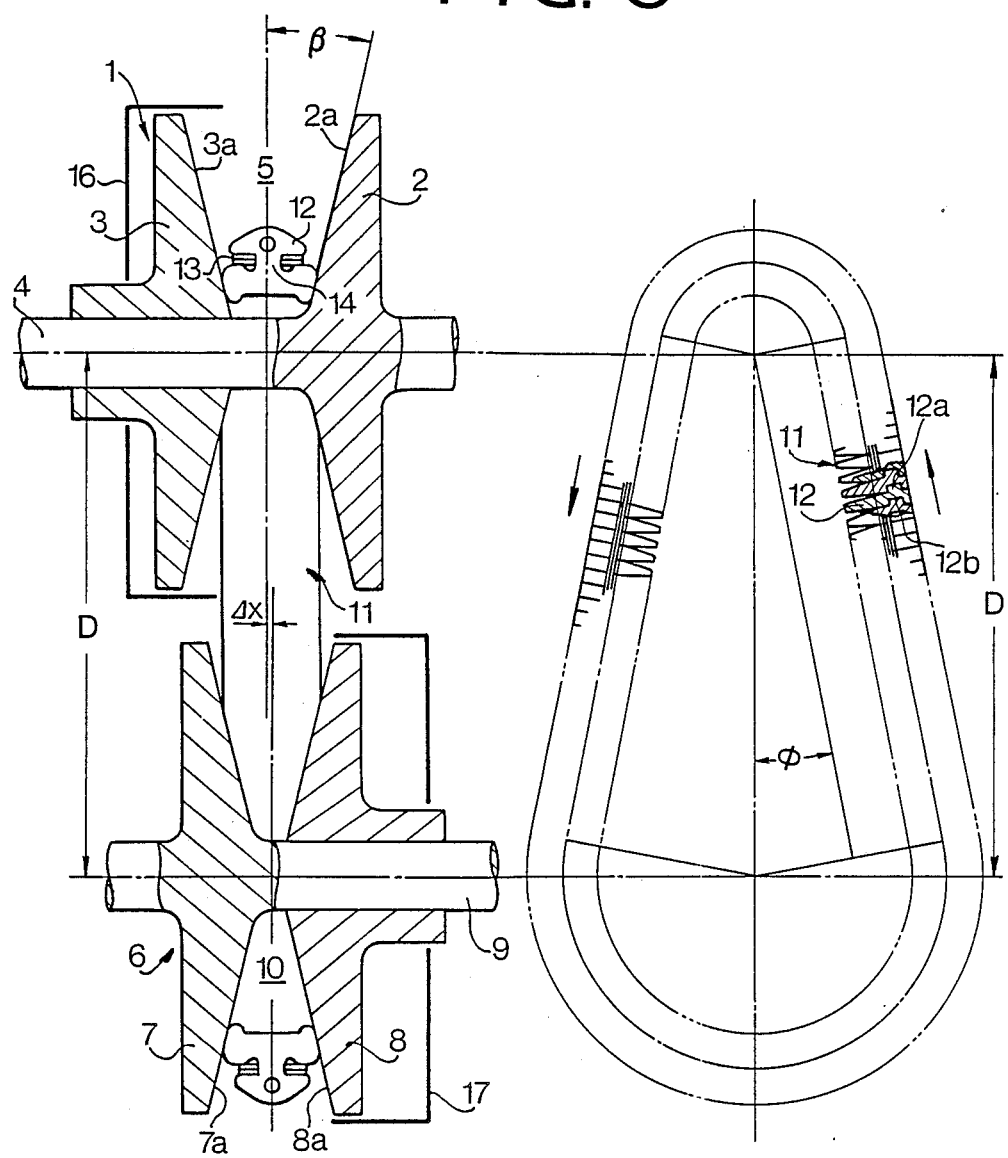
FIG. 3 is a schematic cross section of a conventional belt-drive transmission at the pulley ratio large.

Referring to FIG. 1, a belt-drive transmission to which the present invention is applied has the same construction as a conventional transmission shown in FIG. 3. The same numerals as those in FIG. 3 designate the same parts in FIG. 1.

In the belt drive transmission, the pulley ratio Top is set to about 0.7 judging from running resistance and power efficiency of the vehicle. At such a pulley ratio, that is when the running speed of the belt is at maximum (Vmax), energy of the relative motion of the carrier 13 and the element 12 of the belt 11 is maximum, resulting in severe damage if the edges of the pillar portion 14 of the element 12 and the carrier 13 brush against each other. In addition, tension caused by centrifugal force exerted on the carrier 13 is increased. Tensions of the carrier 13 at typical pulley ratios are compared in the following table.

TABLE

| Pulley ratio (i) | 2.5 | 0.7 | 0.5 |
| --- | --- | --- | --- |
| Maximum engine speed (r.p.m.) | 3500 | 6000 | 3500 |
| Torque (kgf · m) | 8.1 | 7.2 | 8.1 |
| Secondary oil pressure for driven pulley P (kgf/cm$^2$) | 28 | 14 | 13 |
| Tension of one of the edges of the carrier at tight side (kgf) | | | |
| Oil pressure | 120 | 100 | 90 |
| torque | 90 | 45 | 45 |
| centrifugal force | 9 | 110 | 48 |
| total | 219 | 255 | 183 |

In this table, "tight side" means a straight portion of the left side in FIG. 1 because the power from the drive pulley is transmitted.

As shown in the table, the maximum tension, which is 255 kgf, is exerted on the carrier 13 when the pulley ratio is 0.7, namely at Vmax. Furthermore, the transmission is always driven at full load at Vmax. Therefore, it is assumed that at Vmax, friction between the pillar portion 14 of the element 12 and the edge of the carrier 13 becomes very large.

Figure 5:
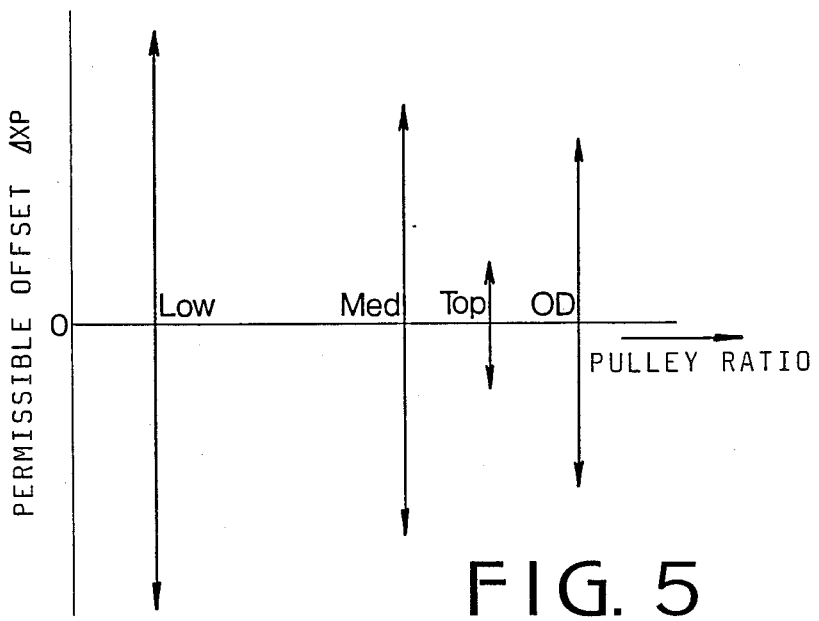
FIG. 5 is a graph showing permissible amount of the offset.
Figure 6:
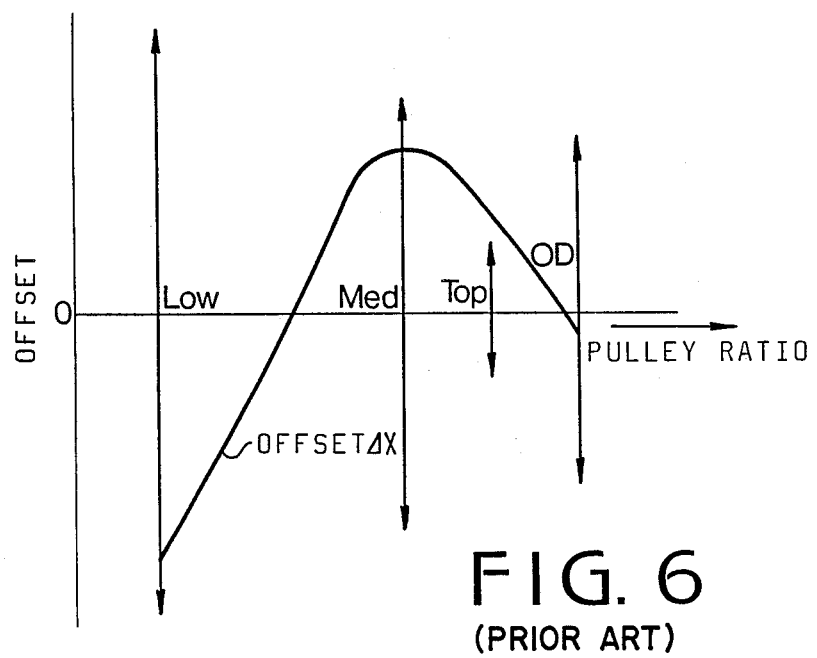
FIG. 6 is a graph showing actual amount and permissible amount of the offset in the conventional system.
Figure 7:
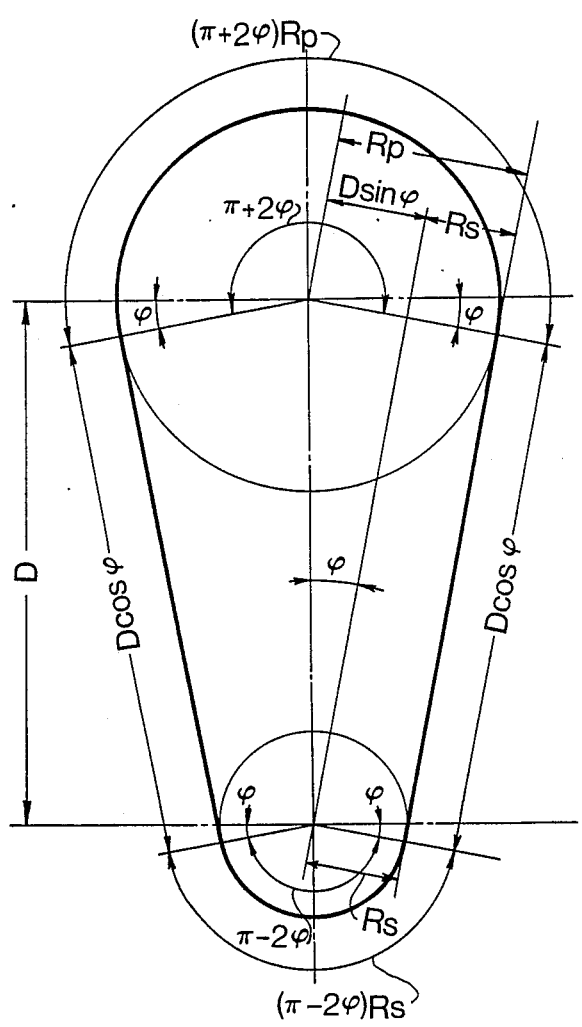
FIGS. 7 and 8 are illustrations for explaining the amount of the offset.
Figure 8:
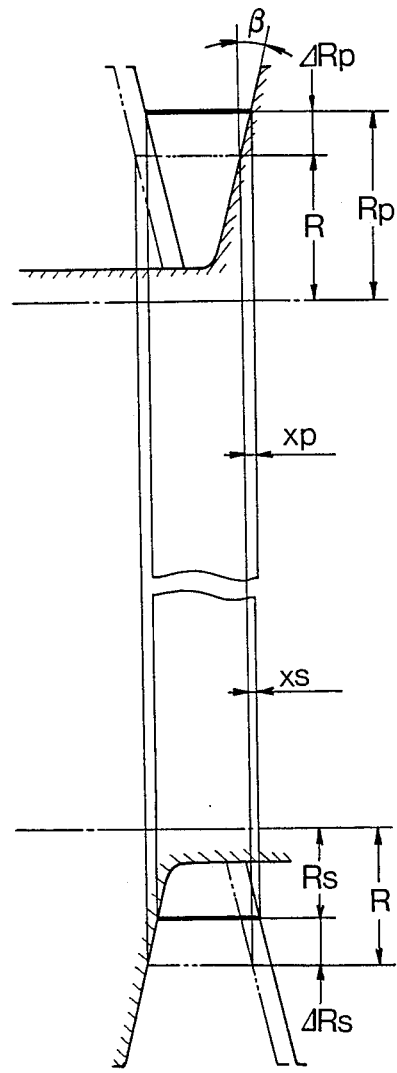

In addition, as can be understood from FIG. 5, the range of the permissible value ΔXp, wherein the elements 12 entering the pulley is kept stable, is narrow at the pulley ratio Top. If the running of the belt is irregular, the elements are apt to be deviated causing damage to the pulleys, elements and carrier. Accordingly, it is desirable to render the amount of the offset ΔX zero at the pulley ratio Top.

For this purpose, the center lines of the grooves 5 and 10 of the pulleys 1 and 6 are initially offset so that the offset at the pulley ratio Top becomes zero. Thus, when the pulley ratio is at the top of 0.7, the center lines are aligned as shown by the pulleys in the solid lines in FIG. 1.

In the belt-drive transmission wherein D=140 mm, β=11°, R=49.2 mm, the amount of offset (ΔXvmax), that is when the running speed of the belt is at maximum, is 0.23 mm from the formula (8). Therefore, the amount of initial offset ΔXd is expressed as follows.

$$\Delta Xd = 2D/\pi\{(1-\cos\phi-\phi\sin\phi)\}\tan\beta - 0.6 \qquad (9)$$

where the constant 0.6 is obtained by rounding off the sum of 0.23 and 0.367.

Figure 2:
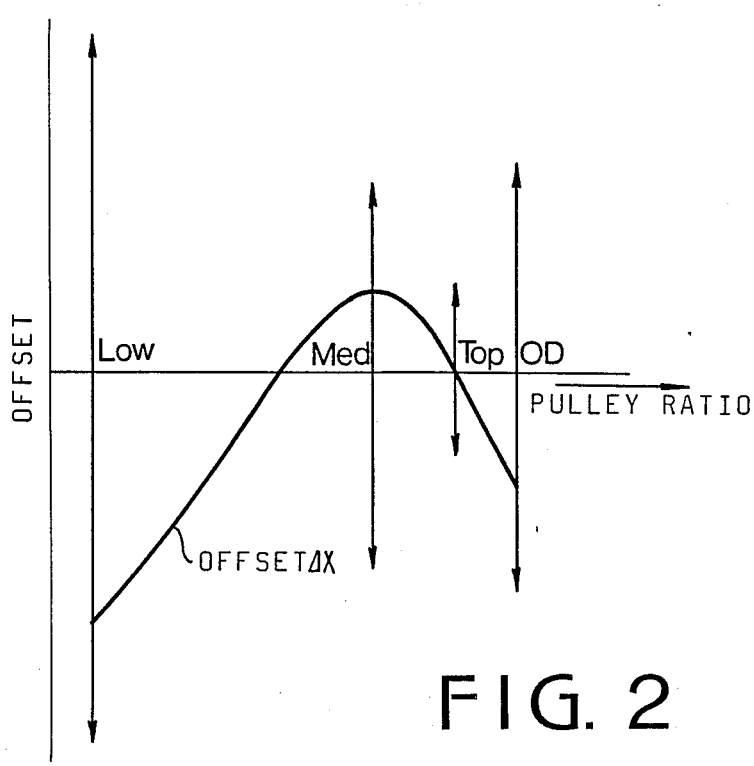
FIG. 2 is a graph showing relationship between pulley ratio and permissible amount of the offset in the present invention.
Figure 4:
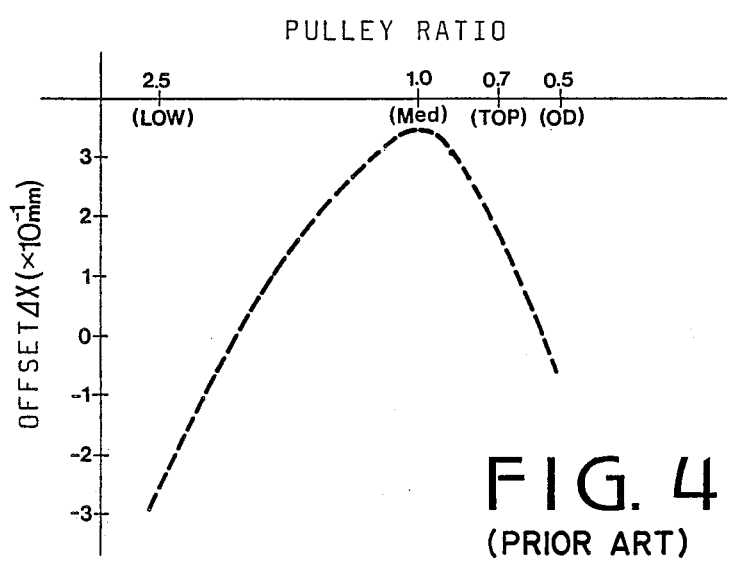
FIG. 4 is a graph showing relationship between pulley ratio and amount of offset in the belt drive transmission of FIG. 3.

The variation of offset ΔX in accordance with the formula (9) is shown in FIG. 2. The offset ΔX at each pulley ratio is within the range of permissible values ΔXp.

In addition, the initial offset ΔXd may be calculated further taking into account of reaction of gear and case deflection caused by the torque of Vmax. If the offset is increased for example, 0.2 mm by the reaction of gear and case deflection −0.2 mm is further added to the afore-described value −0.6. It should be noted that the symbol, "+" or "−" is determined depending on the direction of the side force of gear and case deflection.

From the foregoing it will be understood that the present invention provides a continuously variable belt-drive transmission wherein the offset of the center lines of the grooves of the drive and driven pulleys is substantially zero when the running speed of the belt is at maximum. Accordingly, the offset is within a permissible range at every pulley ratio, thereby increasing the durability of the belt.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. In a continuously variable transmission for transmitting power of an internal combustion engine, including a drive pulley having a fixed disc secured to a main shaft, and an axially movable disc axially slidably mounted on the main shaft, said discs defining a groove therebetween having a center line, a driven pulley having a fixed disc secured to an output shaft, and an axially movable disc axially slidably mounted on the output shaft, said discs of said driven pulley defining a groove therebetween having a center line, and a belt engaged with both pulleys between the grooves, the widths of the grooves between the respective discs being continuously variable and defining continuously variable pulley ratios with corresponding belt speeds, the improvement comprising:

amount of offset between the center line of the groove of the drive pulley and the center line of the groove of the driven pulley is substantially zero when the widths of the respective grooves of the respective discs of the drive and driven pulleys define a pulley ratio providing a maximum belt speed.

2. The continuously variable transmission according to claim 1 wherein each of movable discs is slided by hydraulic means.

3. The continuously variable transmission according to claim 1 wherein said axially movable discs of the drive pulley and the driven pulley are arranged on opposite sides of the center lines.

4. A continuously variable transmission for transmitting power of an internal combustion engine, comprising a drive pulley having a fixed disc secured to a main shaft, and a movable disc axially slidably mounted on the main shaft, a driven pulley having a fixed disc secured to an output shaft, and a movable disc axially slidably mounted on the output shaft, and a belt engaged with both pulleys, the fixed discs of both the pulleys being disposed at a position where center lines of grooves defined between the respective discs of the respective pulleys substantially coincide with each other at a pulley ratio providing a maximum belt speed and are offset from each other by a maximum offset at a maximum pulley ratio.

5. The continuously variable transmission according to claim 4, wherein the discs of both the pulleys are arranged in an OD (over drive) position such that the center lines are offset by an amount smaller than said maximum offset and substantially equal in magnitude to their offset at a medium pulley ratio.

6. In a continuously variable transmission for transmitting power of an internal combustion engine, including a drive pulley having a fixed disc secured to a main shaft, and a first movable disc axially slidably mounted on the main shaft, said discs defining a groove therebetween having a center line, a driven pulley having a fixed disc secured to an output shaft, and a second movable disc axially slidably mounted on the output shaft, said discs of said driven pulley defining a groove therebetween having a center line, and a belt engaged with both pulleys on conical surfaces of the discs between the grooves, the widths of the grooves between the respective discs being continuously variable and defining continuously variable pulley ratios with corresponding belt speeds, the improvement comprising:

initial set means responsive to an amount of offset of both center lines between a minimum pulley ratio and a maximum pulley ratio for determining an initial set value of the pulleys, means for providing permissible offset data at each pulley ratio in accordance with experiment, calculating means for calculating a correcting value in accordance with the initial set value and the permissible offset data at maximum running speed of the belt, and setting means for setting in accordance with the correcting value, such that the amount of offset between the center line of the groove of the drive pulley and the center line of the groove of the driven pulley becomes substantially zero when the widths of the grooves of the respective discs of the drive and driven pulleys define a pulley ratio providing the maximum running speed of the belt so as to prevent the belt from easily wearing out and the conical surfaces from becoming rough.

7. A method of setting drive and driven pulleys of a continuously variable transmission for transmitting power of an internal combustion engine, the drive pulley having a fixed disc secured to a main shaft, and a first movable disc axially slidably mounted on the main shaft, said discs defining a groove therebetween having a center line, the driven pulley having a fixed disc secured to an output shaft, and a second movable disc axially slidably mounted on the output shaft, said discs of said driven pulley defining a groove therebetween having a center line, and a belt engaged with both pulleys on conical surfaces of the discs between the grooves, the widths of the grooves between the respective discs being continuously variable and defining continuously variable pulley ratios with corresponding belt speeds, the method of setting comprises the steps of:

deciding an initial set value of the pulleys in response to an amount of offset of both center lines between a minimum pulley ratio and a maximum pulley ratio, providing permissible offset data at each pulley ratios in accordance with experiment, calculating a correcting value in accordance with the initial set value and the permissible offset data at maximum running speed of the belt, and setting in accordance with the correcting value the amount of offset between the center line of the groove of the drive pulley and the center line of the groove of the driven pulley substantially zero when the widths of the grooves of the respective discs of the drive and driven pulleys define a pulley ratio providing the maximum running speed of the belt so as to prevent the belt from easily wearing out and the conical surfaces from becoming rough.

* * * * *